United States Patent [19]
Lin

[11] Patent Number: 5,158,270
[45] Date of Patent: Oct. 27, 1992

[54] ENCLOSED HYDRAULIC CYLINDER ACTING AS A TENSION-BUFFER

[76] Inventor: Norman R. M. Lin, 4, 29 Alley, Jen San Rd., Keelung, Taiwan

[21] Appl. No.: 815,025

[22] Filed: Dec. 31, 1991

[51] Int. Cl.⁵ .............................................. F16F 9/06
[52] U.S. Cl. ..................................... 267/226; 267/74; 188/269; 188/313
[58] Field of Search ................ 267/226, 71, 72, 64.15, 267/134, 74; 188/313, 314, 269, 318; 114/213, 214; 440/61; 104/117

[56] References Cited

U.S. PATENT DOCUMENTS

| | | | |
|---|---|---|---|
| 1,071,518 | 8/1913 | Hand | 267/226 |
| 2,323,321 | 7/1943 | Futral | 188/313 |
| 4,627,375 | 12/1986 | Davis et al. | 267/72 |
| 4,854,541 | 8/1989 | McConnell | 267/226 |

Primary Examiner—Robert J. Oberleitner
Assistant Examiner—Kevin D. Rutherford
Attorney, Agent, or Firm—Bacon & Thomas

[57] ABSTRACT

An enclosed hydraulic cylinder which may be used as a tension buffer, mainly consists of a body casing having an integrally formed sealed inner passage and a piston stem. The body casing is internally divided into a pressure chamber, a buffer chamber, and a regulation chamber between the pressure chamber and the buffer chamber. When the body casing and the piston stem are subjected to external pulling force in reverse direction, fluid filled in the pressure chamber, being compressed by air coming from an air intake chamber communicable with the pressure chamber and by the piston stem, flows through a flow-limit disposed near outer end of the pressure chamber and into the sealed inner passage before it enters the regulation chamber and thereby adjusts the inner pressure of the cylinder. The buffer chamber adjoins the regulation chamber and the room thereof can automatically adjust to relieve the hydraulic pressure in the regulation chamber and prevent the body casing from excess hydraulic pressure. The flow-limit may limit the amount and speed of fluid flowing to the sealed inner passage and the regulation chamber and thereby slow down the pulling force applied on the piston stem. Reversely, when the fluid flows back to the pressure chamber from the regulation chamber, the amount and speed of fluid passing there is increased to enhance the restoration of the piston stem.

2 Claims, 5 Drawing Sheets

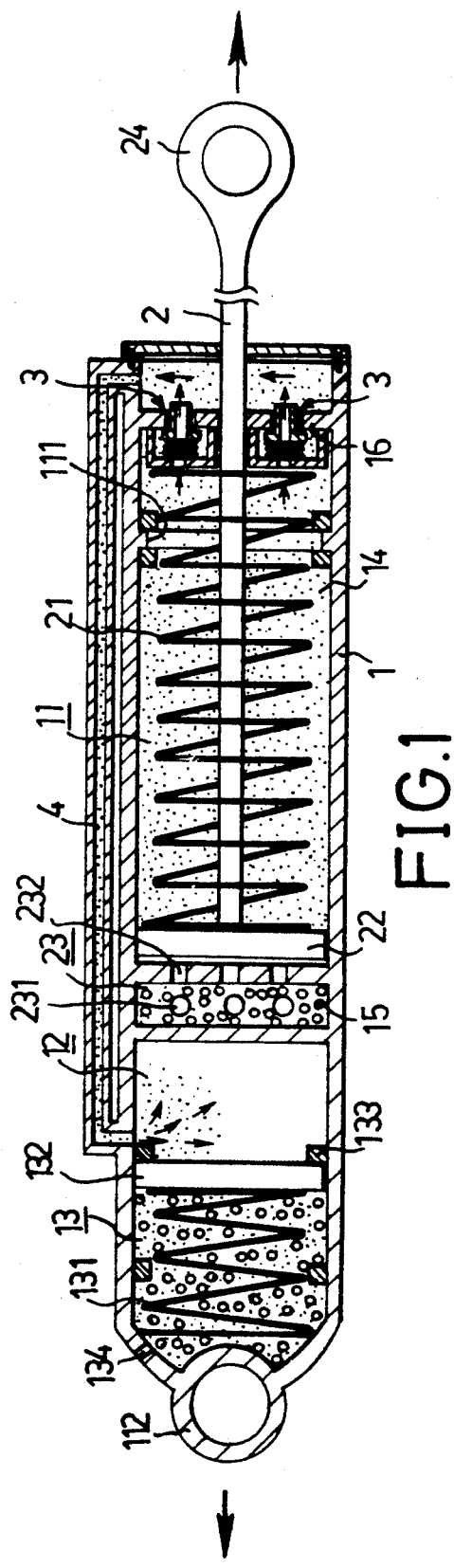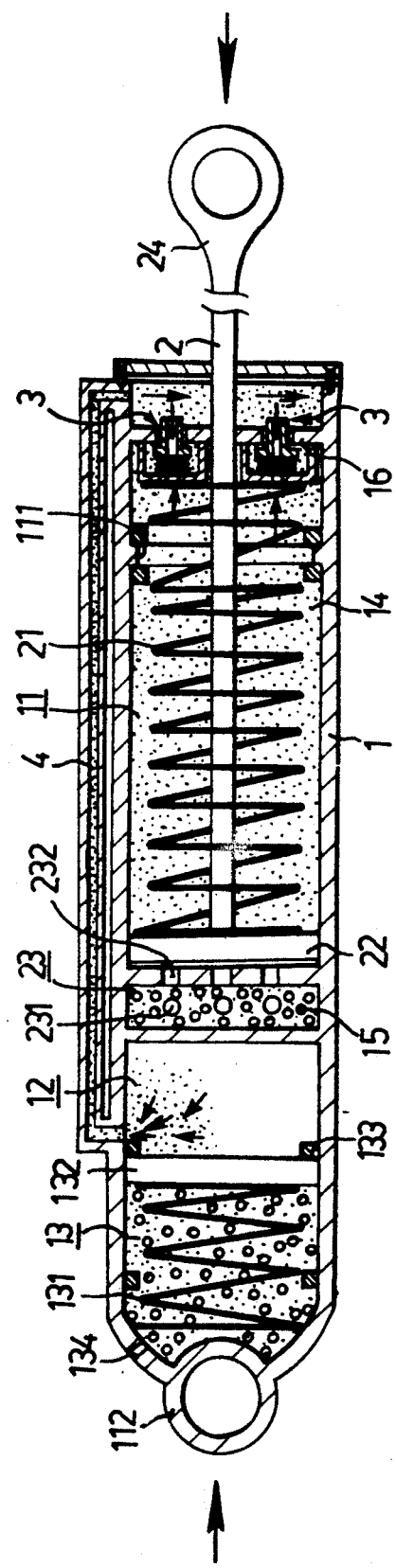

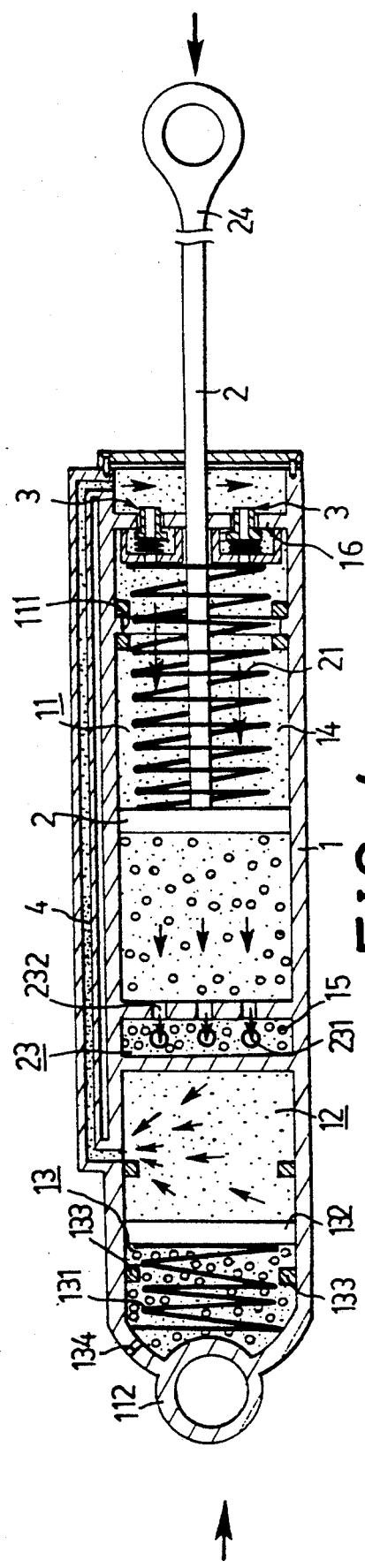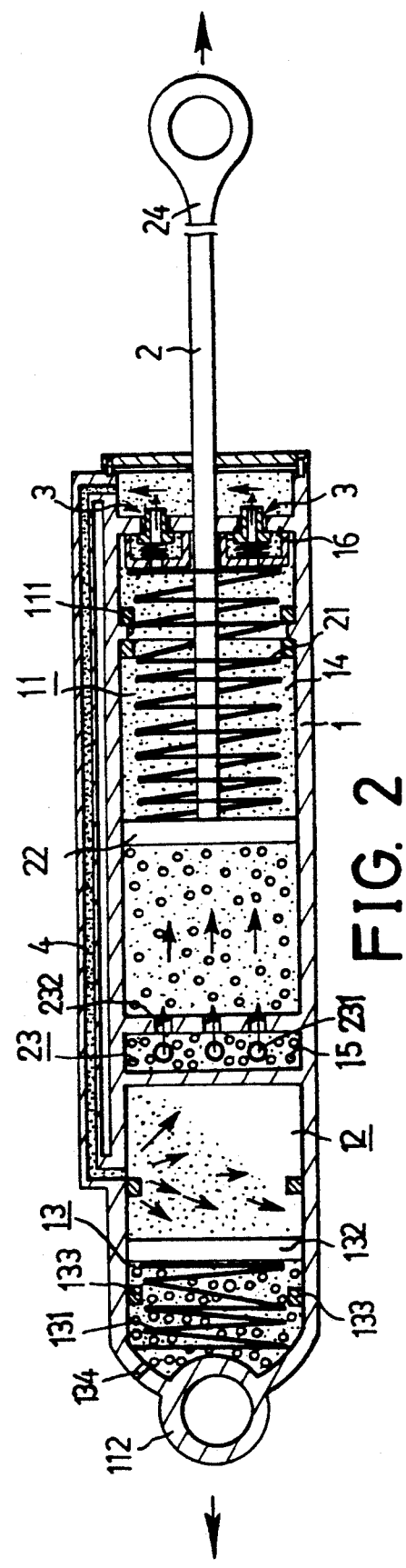

ENCLOSED HYDRAULIC CYLINDER ACTING AS A TENSION-BUFFER

BACKGOUND OF THE INVENTION

The present invention relates to an enclosed hydraulic cylinder acting as a tension-buffer, particularly to a convenient and utility hydraulic cylinder in which an integrally sealed passage design enables it to automatically adjust its inner pressure, and, a plurality of flow-limit means incorporated therein further enables the cylinder to act as a tension buffer.

A conventional cylinder, either a hydraulic or a steam one, usually comprises a body casing and a piston movably disposed inside the body casing; an intake pipe and a delivery pipe (for a simpler design, these pipes are combined into one) are connected to the body casing for transfering and discharging high-pressure fluid or gas, respectively, thereby enables the piston to reciprocally travel inside the body casing. By connecting to the cylinder an object may reciprocally move, accordingly.

Since such cylinder is usually electrically controlled and requires external intake and delivery pipes for high-pressure medium as well as a control unit, such as a compressor, to control the intake and discharge of the high-pressure medium, a much more complicated and precise integral configuration is usually required. For where without power supply equipment or necessary room, the conventional electrically-controlled cylinders may not meet the utility requirement. Moreover, the conventional cylinder is usually suitable for using together with an object which needs reciprocating movement (such as the open and close of a door leaf) under electric control. For an object subjected to irregularly applied force, such as a boat tied by a cable rope and floating over water, the conventional electrically-controlled cylinder is completely not applicable to provide any tension buffer. In other words, the conventional cylinder is not utility in the application area the present invention is going to provide.

Another existing simplified buffer is so designed that it has a sleeve and a retractible piston inside the sleeve. The piston has a stem onto which a spring is disposed. When the sleeve and the piston stem ends are subjected to pulling force, the spring may lessen a part of the effect of the force and thereby relieves the tension momentum. Since the spring has fixed modulus of elasticity and its compression magnitude varies directly as force applied to it, the piston stem of buffers using a spring to absorb and relieve its pulling force shall vary its travel directly depending upon the magnitude of tensile strength of the spring. Such buffer can relieve tension to some extent, but it can not stably and effectively lessen the effect of irregularly applied force on an object connected thereto.

SUMMARY OF THE INVENTION

It is a primary object of the present invention to provide a hydraulic cylinder with sealed inner passage, which has a pressure chamber, a regulation chamber, and a buffer chamber provided in its body casing. Whenever a piston stem thereof is pulled relative to the body casing, air outside the body casing is sucked into the pressure chamber, causing the piston to compress fluid in the pressure chamber to flow through flow-limit means and the sealed inner passage thereof before the fluid reaches the regulation chamber at the other side of the body casing. When the fluid in the pressure chamber flows into the regulation chamber, the tension of the cylinder is lessened. The buffer chamber adjoins the regulation chamber and the room of which can automatically adjust with volume of fluid in the regulation chamber so as to relieve the hydraulic pressure in the regulation chamber. Moreover, a compression spring is disposed onto the piston stem to enable the piston stem to restore its original position when the tension is removed.

A hydraulic cylinder according to this invention is structually simplified and much more effective than conventional hydraulic cylinder, and therefore, has higher economical value in its application. The flow-limit means and the stable hydraulic pressure provided by the invention, when comparing with the conventional buffers, enable the invention to be a stable and effective tension buffer superior than the conventional ones.

Another object of the present invention is to provide a hydraulic cylinder in which the flow-limit means each has a movable flexible guide inlet. When the piston stem is pulled relative to the body casing of the cylinder, compress fluid therein to pass the guide inlet and the flow is adequately limited there. Reversely, when the piston stem returns to its original position, the guide inlet flexibly moves away from the port of the flow-limit means, allowing the fluid to quickly flow back to the pressure chamber and speeds the restoration of the piston stem.

BRIEF DESCRIPTION OF THE DRAWINGS

The various objects, techniques used, characteristics, and performance of the present invention can be more clearly understood by referring to the following description of preferred embodiment and the accompanying drawings, wherein FIG. 1 is a longitudinal cross-sectional view of the present invention, showing the first stage operation of the outward pulled piston;

FIG. 2 is still a longitudinal cross-sectional view of the present invention, showing the second stage operation of the outward pulled piston;

FIG. 4 is a longitudinal cross-sectional view of the present invention, showing the first stage restoration of the inward moving piston;

FIG. 5 is still a longitudinal cross-sectional view of the present invention, showing the second stage restoration of the inward moving piston;

DETAILED DESCRIPTION OF THE PREFERRED EMBODIMENTS

Figure 3:
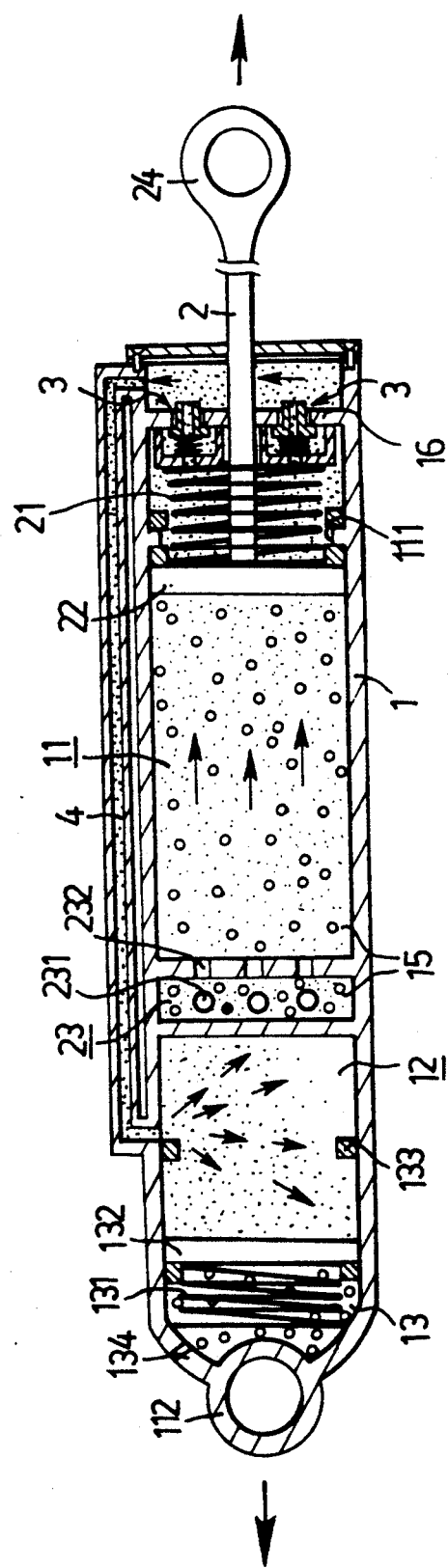
FIG. 3 is still a longitudinal cross-sectional view of the present invention, showing the third stage operation of the outward pulled piston.

First, place refer to FIG. 1. The present invention mainly consists of a cylinder body casing 1 and a piston stem 2. Pull rings 112, 24 are respectively formed at opposite ends of the body casing 1 and the piston stem 2 for objects to connect thereto. The body casing 1 is further internally divided into a pressure chamber 11, a regulation chamber 12, and a buffer chamber 13; the piston stem 2 extends into the pressure chamber 11 from one end of the body casing 1 opposite to the pull ring 112; a first compression spring 21 is put onto the piston stem 2 at a portion extended into the pressure chamber 11, allowing a piston 22 of the piston stem 2 to reciprocally move inside the pressure chamber 11 within a fixed distance defined by one end of the pressure chamber 11 and a stop flange 111 disposed in the pressure chamber 11 at an adequate position. In the pressure chamber 11, proper fluid 14 is filled. An air intake chamber 23 adjoining the pressure chamber 11 at an end opposite to the piston stem 2 end has a plurality of air ports 231 which communicate with outside of the body casing 1. Air passages 232 are further provided to connect the pressure chamber 11 and the air intake chamber 23, allowing air 15 coming into the air intake chamber 23 through the air ports 231 to pass the air passages 232 and flows into the pressure chamber 11. Air 15 flowed into the pressure chamber 11 is separated from the fluid 14 by the piston 22 and would not mix with the fluid 14 even when the piston 22 shifts inside the pressure chamber 11. A plurality of flow-limit means 3 are provided at the other end of the pressure chamber 11 opposite to the piston 22 for limiting flow of fluid 14 compressed by the piston 22 and passing the flow-limit means 3. The structure and function of the flow-limit means 3 is described in detail later.

After passing the flow-limit means 3, the compressed fluid 14 flows down along a sealed inner passage 4 integrally formed with the body casing 1 and is led to the regulation chamber 12 which is separated from the pressure chamber 11 by the air intake chamber 23. The pressure chamber 11, the inner sealed passage 4, and the regulation chamber 12 together constitute a communicated space filled with fluid 14. To facilitate a smooth entrance of the compressed oil fluid 14 into the regulation chamber 12 from the pressure chamber 11 via the sealed inner passage 4, the buffer chamber 13 adjoining another side of the regulation chamber 12 is provided with a second compression spring 131 and a compression pad 132 therein. The compression pad 132 functions as a piston and is reciprocally shiftable inside the body casing 1 within a range defined by a pair of second stop flanges 133 separately disposed inside the buffer chamber 13 at two proper positions. The compression pad 132 also acts as a watertight partition between the regulation chamber 12 and the buffer chamber 13. The buffer chamber 13 is substantially an air chamber having a first through hole 134 formed on the body casing 1 enclosing this chamber for air to come in. When the compressed fluid 14 enters the regulation chamber 12, the compression pad 132 is pushed and forced to shift backward and thereby prevents the body casing 1 from excess pressure. When the external pulling force applied on the hydraulic cylinder is removed and the piston 22 returns to its original position, the second compression spring 131 shall push back the compression pad 132 and causes the fluid 14 in the regulation chamber 12 to flow back into the sealed inner passage 4 and the pressure chamber 11, and thereby, speeds the restoration of the piston stem 2.

Figure 7:
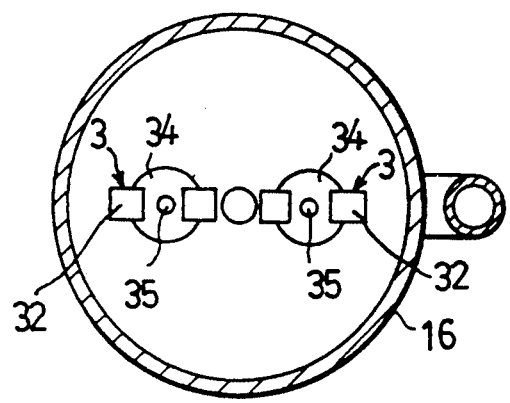
FIG. 7 is a cross section taken from FIG. 6.
Figure 6:
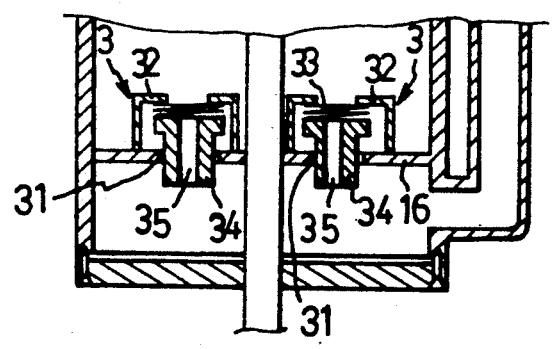
FIG. 6 is a fragmental longitudinal cross-sectional view of the present invention, showing the structure of the flow-limit means thereof.

Please refer to FIGS. 1, 6 and 7 for the detailed structure of the flow-limit means 3. A partition 16 is disposed in the pressure chamber 11 near where the fluid 14 is compressed by the piston 22. In addition to a hole allowing the piston stem 2 to extend through, there are a plurality of second through holes 31 formed on the partition 16 around the piston stem hole. At each of the second through holes 31, a flow-limit means 3 is fixed. The flow-limit means 3 each consists of a pair of reverse L-brackets 32 perpendicularly fixed to two sides of the second through hole 31, a third compression spring 33 positioned between the two reverse L-brackets, and a flow-limit block 34 snugly inserted in the second through the hole 31 with its front end pushing against the third compression spring 33. The flow-limit block 34 has a smaller diameter fluid passage 35 centrally formed inside it for limited flow of fluid 14 to pass there.

Please further refer to FIGS. 1 through 5 for the operation of the hydraulic cylinder according to the present invention. FIGS. 1, 2 and 3 illustrate the movements in a hydraulic cylinder subjected to external pulling force, that is, when the body casing 1 and the piston stem 2 are subjected to external pulling force in opposite direction, the piston 22 of the piston stem 2 in the pressure chamber 11 shall drive the first compression spring 21 thereon to compress and causes fluid 14 in the pressure chamber 11 to flow through the flow-limit means 3. At this point, the shifting of the piston 22 induces the change in the inner pressure of the pressure chamber 11 that causes the air intake chamber 23 to timely suck in air and thereby maintains a balanced inner pressure of the pressure chamber 11, allowing the piston 22 to shift smoothly.

When the fluid 14 is compressed and flows toward the flow-limit means 3, it pushes against the flow-limit block 34 of the flow-limit means 3 and causes the same to insert into the through hole 31. At this time, fluid 14 must pass the smaller diameter fluid passage 35 before it can enter into the sealed inner passage 4 and thereby reduces the tension momentum of the body casing 1 and the piston stem 2.

When the fluid 14 flows through the sealed inner passage 4 and enters the regulation chamber 12, the compression pad 132 of the buffer chamber 13 is pushed by the fluid 14 to synchronously move sidewards that substantially reduces the pressure brought by the fluid 14 to the regulation chamber 12. Reversely, when the external pulling force applied on the hydraulic cylinder is removed, the restoring elasticity of the first compression spring 21 causes the piston 22 to return its original position, as shown in FIGS. 4 and 5. The fluid 14 in the regulation chamber 12, due to the restoration of the compression pad 132, is compressed and forced back to the sealed inner passage 4, then passes the flow-limit means 3 and returns to the pressure chamber 11.

When the returning fluid 14 flows toward the flow-limit means 3, the increased hydraulic pressure thereof enables it to push the flow-limit block 34 to move away from the second through hole 31 that permits the fluid 14 to pass larger diameter second through hole 31 and enters the pressure chamber 11 more quickly and thereby enables the piston stem 2 to restore more quickly and more stably.

Figure 8:
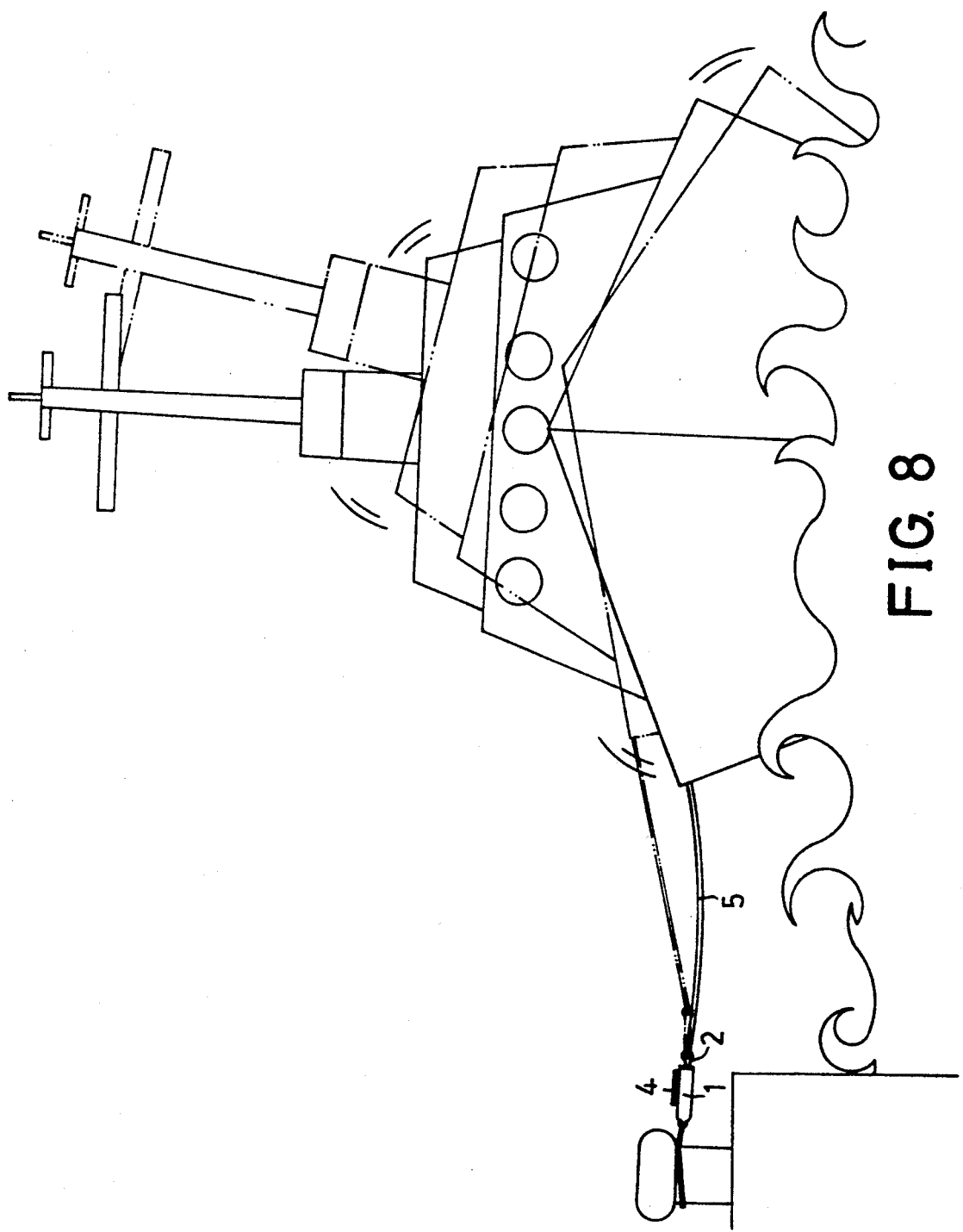
FIG. 8 illustrates a preferred application of the present invention.

FIG. 8 illustrates a preferred application of the present invention. An enclosed hydraulic cylinder according to the present invention is used on a cable rope 5 for tying a boat over water. When the boat is violently swaying due to water waves, the huge pulling force bore by the cable rope 5 can be properly and effectively relieved by the present invention lest the cable rope 5 should be broken that dangerously threatens the safety of the entire boat. The present invention can, of course, be applied to any other similar occasion and gives actually enhanced effect.

According to the above description, it can be seen that the enclosed hydraulic cylinder acting as a tension-buffer according to the present invention is different from those conventional hydraulic cylinders or buffers and is characterized by its simplified but utility design which provides effective, enhanced and economical benefits far beyond those provided by the prior art.

It is to be understood that the form of the present invention shown and disclosed is to be taken as a preferred embodiment of the invention and that various changes in the shape, size and arrangement of parts may be resorted to without departing from the spirit of the invention or the scope of the subjoined claims.

What is claimed is:

1. An enclosed hydraulic cylinder acting as a tension-buffer comprising:

a body casing which is further divided into a pressure chamber, a buffer chamber opposite to said pressure chamber, and a regulation chamber between said pressure chamber and said buffer chamber, and having a pull ring formed at its front end near said buffer chamber;

a piston stem which extends into said pressure chamber from rear end of said body casing near said pressure chamber and having a pull ring formed at its outer end;

said pressure chamber having a first stop flange near an end opposite to said buffer chamber, a communicable air intake chamber at an end opposite to said stop flange, and a plurality of flow-limit means provided on a partition at an end near and outside said first stop flange, and being filled with proper fluid;

said air intake chamber communicating with said pressure chamber with a plurality of air passages and having a plurality of air ports formed on its wall to allow air outside of said body casing to pass therethrough;

said regulation chamber being separated from said pressure chamber and said air intake chamber but communicable with said pressure chamber with a sealed inner passage integrally formed in said body casing;

said buffer chamber having a first through hole formed on its wall allowing outside air to come in, a compression pad used as a watertight partition between said regulation chamber and said buffer chamber, and a first compression spring connected to said compression pad at one end and enabling said compression pad to reciprocally shift when said compression pad being subjected to external pressure, and thereby changing the space of said regulation chamber and reducing the tension of said body casing;

said piston stem having a second compression spring wound on a portion extended into said pressure chamber, allowing a piston at front end of said piston stem to reciprocally move in said pressure chamber within a distance defined by said first stop flange and an end of said pressure chamber opposite to said first stop flange; said piston also functioning as a airtight partition to separate air coming from said air intake chamber from said fluid filled in said pressure chamber;

said pressure chamber, said sealed inner passage, and said regulation chamber together forming an enclosed fluid route which allows said fluid in said pressure chamber to flow from said pressure chamber into said regulation chamber via said sealed inner passage when said piston stem being pulled outward by external force, or allows said fluid in said regulation chamber to flow from said regulation chamber back to said pressure chamber via said sealed inner passage when external pulling force being removed.

2. An enclosed hydraulic cylinder acting as a tension-buffer as claimed in claim 1, wherein said flow-limit means are fitted in second through holes formed on said partition of said pressure chamber and each mainly consists of a pair of reverse L-brackets fixedly mounted to two sides of said second through hole on said partition, a flow-limit block just plugged into said second through hole, and a third compression spring disposed between said pair of reverse L-bracket and said flow-limit block, allowing said flow-limit block to movably shift into and out of said second through hole; and said flow-limit block having a smaller diameter central fluid passage which allows less amount of fluid to pass there.

* * * * *